US006260296B1

(12) United States Patent
Carney, Jr.

(10) Patent No.: US 6,260,296 B1
(45) Date of Patent: Jul. 17, 2001

(54) PHOTOGRAPH DISPLAY SYSTEM

(76) Inventor: Edgar F. Carney, Jr., 2755 Webster St., San Francisco, CA (US) 94123

( * ) Notice: Subject to any disclaimer, the term of this patent is extended or adjusted under 35 U.S.C. 154(b) by 0 days.

(21) Appl. No.: 09/274,147

(22) Filed: Mar. 22, 1999

(51) Int. Cl.[7] .......................................................... G06F 11/02

(52) U.S. Cl. ............................... 40/747; 40/493; 211/169; 211/163

(58) Field of Search .............................. 40/497, 493, 400, 40/747; 211/169, 163

(56) References Cited

U.S. PATENT DOCUMENTS

| | | | | |
|---|---|---|---|---|
| 447,815 | * | 3/1891 | Frercks | 40/497 |
| 2,265,597 | * | 12/1941 | Finch | 40/400 |
| 2,617,219 | * | 11/1952 | Conley et al. | 40/400 |
| 4,079,532 | | 3/1978 | Lyman . | |
| 4,171,583 | | 10/1979 | Korsemann . | |
| 4,483,085 | | 11/1984 | Barton . | |
| 5,347,738 | | 9/1994 | Zweig et al. . | |
| 5,421,111 | | 6/1995 | Primm et al. . | |

* cited by examiner

*Primary Examiner*—Casandra H. Davis
(74) *Attorney, Agent, or Firm*—Robert Charles Hill

(57) ABSTRACT

A photograph display and organizer comprises a central post that can freely rotate on a base. The post is square or hexagonal or octagonal in cross-section to provide either four, six, or eight sides to which panel pivots are mounted. Each side has a top and bottom pivot plate that can receive as many as five sets of pivot axles each attached to a frame. Foam-board display panels are inserted into each frame which is constructed of metal U-channel material. A U-channel closure is attached between the open-ends of each frame piece to retain the corresponding display panel. Such arrangement allows a user to flip through panels like pages in a book and look at all the photographs mounted on the two opposite surfaces of the display pages. The whole assembly can be rotated like a turnstile by a user who wishes to look at the photographs mounted on the display panels on the side and back parts of the central post.

4 Claims, 3 Drawing Sheets

PHOTOGRAPH DISPLAY SYSTEM

BACKGROUND OF THE INVENTION

1. Field of the Invention

The present invention relates to display racks and frames, and more particularly to photograph print display systems with rotating panels on pivots.

2. Description of Related Art

The displaying and storage of print photographs and other such memorabilia sometimes requires the use of books, binders, and wall frames. This is particularly true in libraries, museums, commercial businesses, and on the job. At home, photo albums get loaded with photos and put on shelves or in closets and are not very handy. When there is a large collection of photographs, particularly several on a single related subject, it can be difficult to properly and adequately display them with prior art methods and devices.

SUMMARY OF THE INVENTION

An object of the present invention is to provide a display system that allows many print photographs to be seen by casual viewers.

Another object of the present invention is to provide a photograph display and organizer that can be comfortably viewed by people who are seated.

Briefly, a photograph display and organizer embodiment of the present invention comprises a central post that can freely rotate on a base. The post is square, hexagonal or octagonal in cross-section to provide either four, six or eight sides to which panel pivots are mounted. Each side has a top and bottom pivot plate that can receive as many as five sets of pivot axles each attached to a frame. Foam-board or hard board (one or two pieces back to back) display panels are inserted into each frame which is constructed of metal U-channel material. A U-channel closure is attached between the open-ends of each frame piece to retain the corresponding display panel and the plastic at each face. Such arrangement allows a user to flip through panels like pages in a book and look at all the photographs mounted on the two opposite surfaces of the display pages. The whole assembly can be rotated like a turnstile by a user who wishes to look at the photographs mounted on the display panels on the side and back parts of the central post.

An advantage of the present invention is that a photograph display and organizer is provided that can be comfortably used while standing or sitting.

Another advantage of the present invention is that a photograph display and organizer is provided that is simple and easy to operate.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
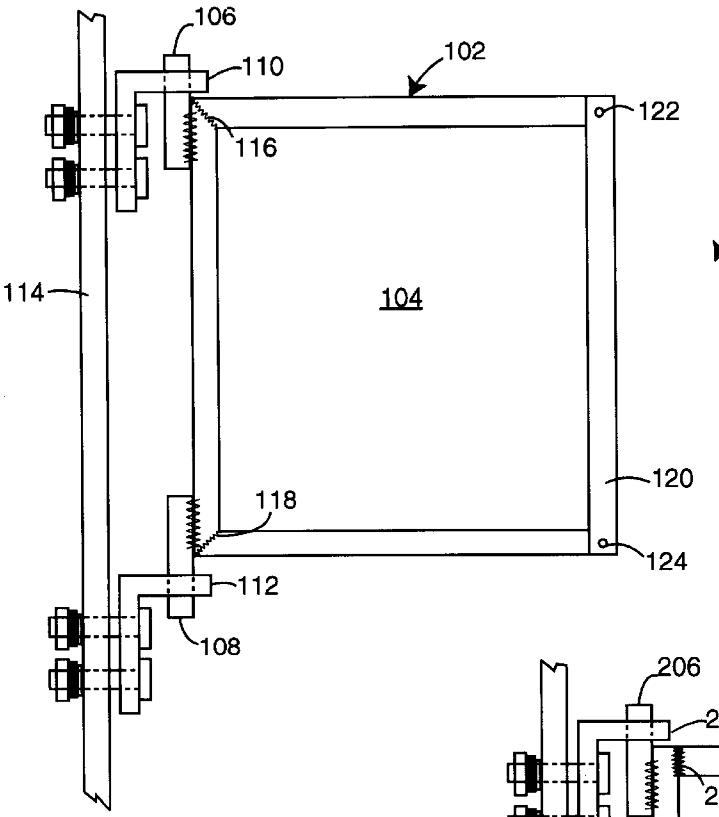
FIG. 1 illustrates an photograph display system embodiment of the present invention.

FIG. 1 illustrates an photograph display system embodiment of the present invention, referred to herein by the reference numeral 100. The photograph display system 100 includes at least one vertically oriented frame 102 constructed of half-inch square steel U-channels. The open part of the U-channels are directed inward to be able to hold an insertable panel 104. A 3⁄16" thick white foam board material, or two hard board photo display backings with one at each face, is preferably used for each panel 104 and both sides are covered with a 1⁄16" thick clear plastic sheeting.

A pair of pivots 106 and 108 are welded to the top and bottom of one side of the frame 102 and allow the frame to swing horizontally. The material used for the pivots 106 and 108 can be quarter-inch round steel rod. The pivots 106 and 108 respectively engage a pair of upper and lower pivot plates 110 and 112. When there is more than one frame 102, multiple holes in the same upper and lower pivot plates 110 and 112 are provided so that a "book" of swinging frames can be accommodated. The upper and lower pivot plates 110 and 112 mount one above the other on a wall 114 shown in cross-section in FIG. 1. The frame 102 is constructed with miter cuts in the U-channel material that are joined with a pair of welds 116 and 118 on each side. The frame 102 itself is constructed as a large open "U" with the ends of the open legs capped together with a panel closure 120 made of 9⁄16" high and 5⁄8" wide steel U-channel material secured with a pair of bolts 122 and 124.

Figure 2:
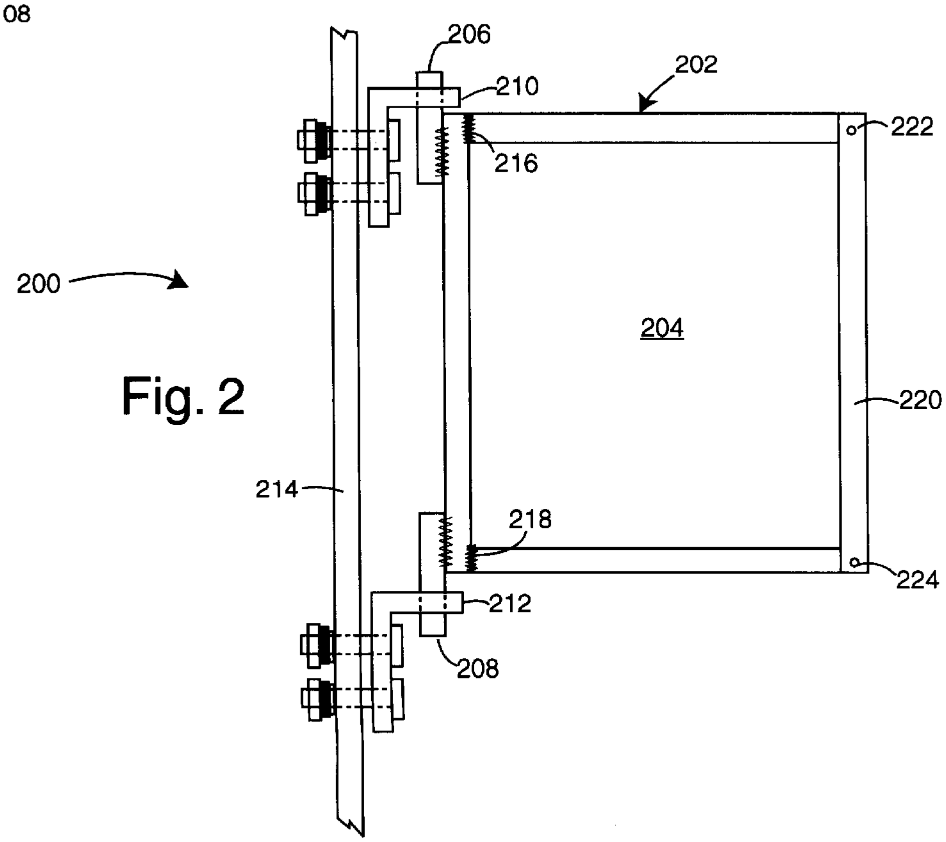
FIG. 2 illustrates another photograph display system embodiment of the present invention.

FIG. 2 illustrates an photograph display system embodiment of the present invention, referred to herein by the reference numeral 200. The photograph display system 200 includes at least one vertically oriented frame 202 constructed of half-inch square steel U-channels at the top and bottom members, and 9⁄16" high and 5⁄8 wide U-channel material at the pivot side member and at the closure side member. The open part of the U-channels are directed inward to be able to hold an insertable panel 204. A pair of pivots 206 and 208 are welded to the top and bottom of one side of the frame 202 and allow the frame to swing horizontally. The material used for the pivots 206 and 208 can be quarter-inch round steel rod. The pivots 206 and 208 respectively engage a pair of upper and lower pivot plates 210 and 212. When there is more than one frame 202, multiple holes in the same upper and lower pivot plates 210 and 212 are provided so that a "book" of swinging frames can be accommodated. Preferred embodiments of the present invention typically have five "pages" to such a book. The upper and lower pivot plates 210 and 212 mount one above the other on a wall 214 shown in cross-section in FIG. 2. In contrast to frame 102 in FIG. 1, the frame 202 is constructed with straight cuts in the U-channel material that are joined with a pair of welds 216 and 218 on each side, and all around the top if desired. The frame 202 itself is constructed as a large open "U" with the ends of the open legs capped together with a panel closure 220 made of 9⁄16" high and 5⁄8 wide steel U-channel material secured with a pair of bolts 222 and 224.

Although steel material has been suggested, other materials can also be used such as aluminum, bronze, monel, nickel, or any alloy, and even plastics. When metal is used, such is preferably primed and painted to give a good appearance and to protect the metal from corrosion.

Figure 3:
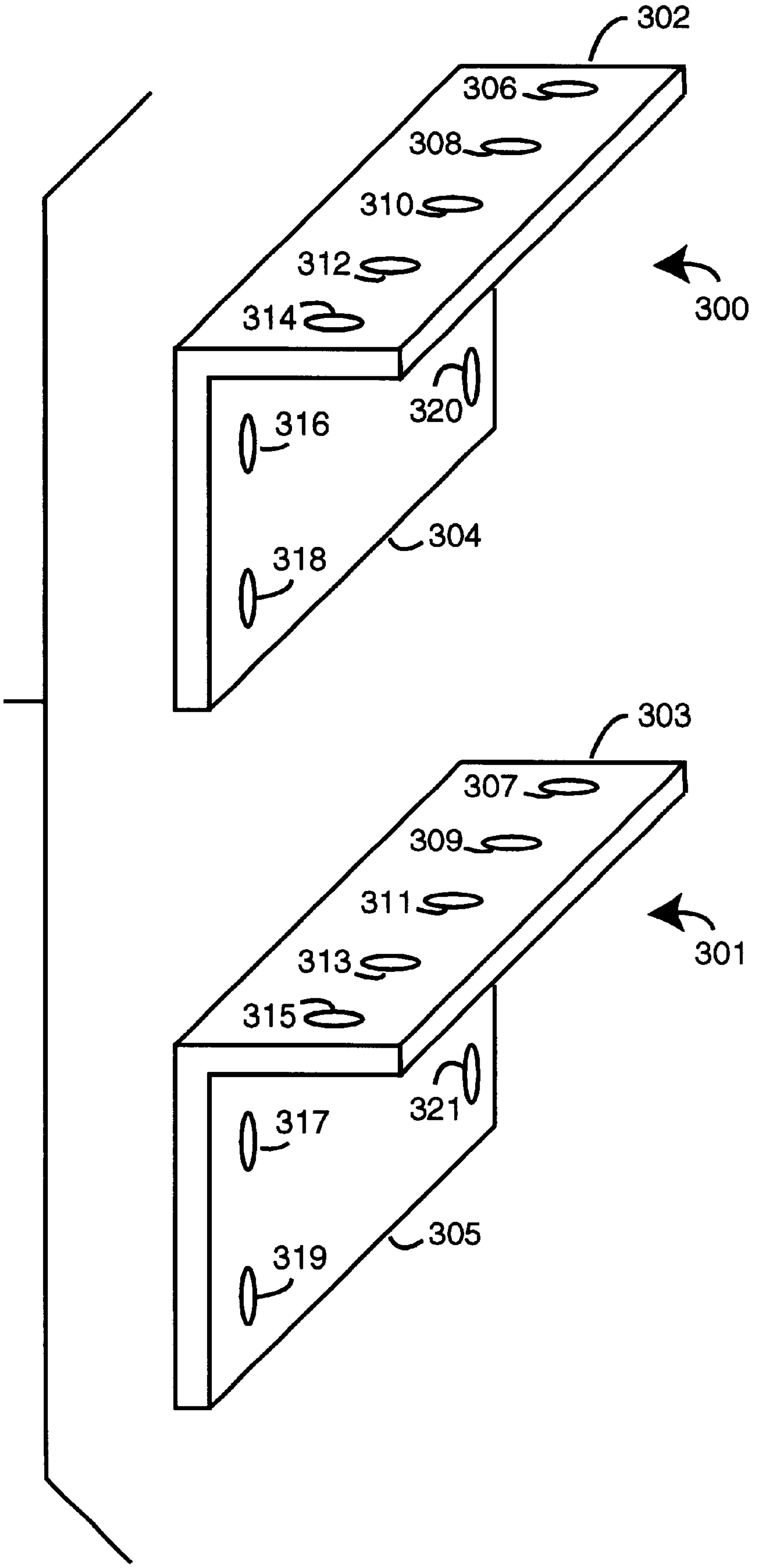
FIG. 3 illustrates a pair of pivot plates that can be used when five panels in their frames are to be assembled in one display system.

FIG. 3 illustrates a pair of pivot plates 300 and 301 that can be used when five panels in their frames are to be assembled in one display system. As many as twenty panels within the span of thirty-nine inches would not be unusual for embodiments of the present invention. The pivot plates 300 and 301 are similar to pivot plates 110, 112, 210, and 212 in FIGS. 1 and 2. Each pivot plate 300 and 301 has a horizontal leg 302, 303 and a vertical leg 304, 305. The horizontal legs each have five, for example, holes 306–315 that accommodate vertical pivot axles, e.g., pivots 106, 108,

206, and 208 in FIGS. 1 and 2. The vertical legs 304, 305 each have four, for example, holes 316–321 that accommodate attachment bolts or screws in FIGS. 1 and 2. (Only three each holes are visible in FIG. 3 due to the perspective.)

Figure 4:
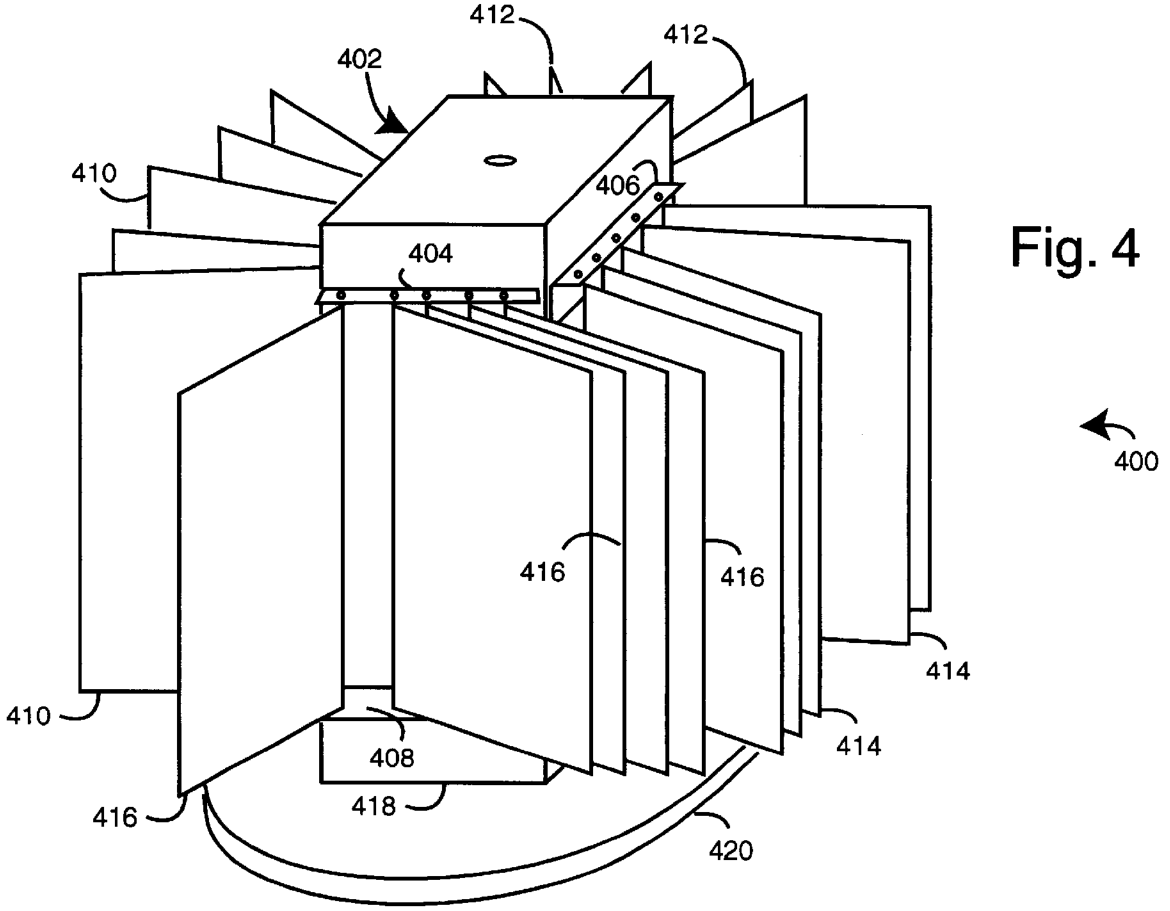
FIG. 4 represents a photo-display carousel, in an embodiment of the present invention.

FIG. 4 represents a photo-display carousel 400, in an embodiment of the present invention. A four-sided central support 402 is provided with ball bearings and a vertical axle so that it can freely rotate. The central support 402 could easily be six-sided, eight sided, or even round in cross-section. A pair of upper pivot plates 404 and 406 are visible and are similar to pivot plate 300 in FIG. 3. Only a single lower pivot plate 408 is visible in FIG. 4 and is similar to pivot plate 301 in FIG. 3. On the left side in FIG. 4 there are five swinging panels 410 that are each similar to photograph display systems 100 and/or 200 in FIGS. 1 and 2. The back side has five swinging panels 412, the right side has five swinging panels 414, and the front side has five swinging panels 416. A bottom portion 418 of the central support 402 is attached to a base 420 with a bearing and/or axle combination that allows the whole to rotate so a can flip through and look at any and all photographs may be mounted to panels 410, 412, 414, and 416.

Table I summarizes how many photograph prints can typically be accommodated and displayed by each panel.

TABLE I

| | Panel Size 28" H × 16" W (outside) 27" H × 15" W (inside) Number of Photos (both faces of panel) | | | Panel Size 14" H × 16" W (outside) 13" H × 15" W (inside) Number of Photos (both faces of panel) | | |
|---|---|---|---|---|---|---|
| Panels | Photo Size 2-½" × 3-½" | Photo Size 3-½" × 5" | Photo Size 4" × 6" | Photo Size 2-½" × 3-½" | Photo Size 3-½" × 5" | Photo Size 4" × 6" |
| 1 | 90 | 40 | 24 | 40 | 16 | 12 |
| 2 | 180 | 80 | 48 | 80 | 32 | 24 |
| 3 | 270 | 120 | 72 | 120 | 48 | 36 |
| 4 | 360 | 160 | 96 | 160 | 64 | 48 |
| 5 | 450 | 200 | 120 | 200 | 80 | 60 |
| 6 | 540 | 240 | 144 | 240 | 96 | 72 |
| 7 | 630 | 280 | 168 | 280 | 112 | 84 |
| 8 | 720 | 320 | 192 | 320 | 128 | 96 |
| 9 | 810 | 360 | 216 | 360 | 144 | 108 |
| 10 | 900 | 400 | 240 | 400 | 160 | 120 |
| 11 | 990 | 440 | 264 | 440 | 176 | 132 |
| 12 | 1080 | 480 | 288 | 480 | 192 | 144 |
| 13 | 1170 | 520 | 312 | 520 | 208 | 156 |
| 14 | 1260 | 560 | 336 | 560 | 224 | 168 |
| 15 | 1350 | 600 | 360 | 600 | 240 | 180 |
| 16 | 1440 | 640 | 384 | 640 | 256 | 192 |
| 17 | 1530 | 680 | 408 | 680 | 272 | 204 |
| 18 | 1620 | 720 | 432 | 720 | 288 | 216 |
| 19 | 1710 | 760 | 456 | 760 | 304 | 228 |
| 20 | 1800 | 800 | 480 | 800 | 320 | 240 |
| 21 | 1890 | 840 | 504 | 840 | 336 | 252 |
| 22 | 1980 | 880 | 528 | 880 | 352 | 264 |
| 23 | 2070 | 920 | 552 | 920 | 368 | 276 |
| 24 | 2160 | 960 | 576 | 960 | 384 | 288 |
| 25 | 2250 | 1000 | 600 | 1000 | 400 | 300 |
| 26 | 2340 | 1040 | 624 | 1040 | 416 | 312 |
| 27 | 2430 | 1080 | 648 | 1080 | 432 | 324 |
| 28 | 2520 | 1120 | 672 | 1120 | 448 | 336 |
| 29 | 2610 | 1160 | 696 | 1160 | 464 | 348 |
| 30 | 2700 | 1200 | 720 | 1200 | 480 | 360 |

Although particular embodiments of the present invention have been described and illustrated, such is not intended to limit the invention. Modifications and changes will no doubt become apparent to those skilled in the art, and it is intended that the invention only be limited by the scope of the appended claims.

What is claimed is:

1. A display system comprising:

a central (post) support mounted to a base such that the (post) support can freely rotate on (a) said base, and having a plurality of flat vertical sides;

a plurality of pairs of top and bottom pivot plates, each pair being attached to one of said plurality of flat vertical sides, wherein each one of the top and bottom pair of plates is mounted one above the other to provide support for a plurality of vertical pivot rods;

a plurality of display frames each having a top and a bottom pivot plate attached to one of the vertical sides that engage a corresponding pair of the top and bottom pivot plates such that each frame can be flipped left and right from a free-swinging end of the respective frame; and a plurality of flat panels wherein each one is captured within a corresponding one of the plurality of display frames, and that provides a mounting surface for a display of items.

2. The display system of claim 1, wherein:

the central (post) support has four flat vertical sides;

the plurality of pairs of top and bottom pivot plates are such that there are four top and bottom pairs and each provides for five sets of the vertical pivot rods; and the plurality of display frames are such that each is constructed of a U-channel material that forms a top, an inner side, and a bottom of each of the display frames, and each further comprise an end closure constructed of a U-channel material to retain each corresponding one of the plurality of flat panels.

3. The display system of claim 1, wherein:

said flat panels have two opposite surfaces, and such arrangement allows a user to flip through the plurality of display frames (like pages in a book) and look at whatever is (all the photographs) mounted on the two opposite surfaces of the flat panels.

4. The display system of claim 1, wherein:

the plurality of flat panels have photographic prints attached for a user to view and have a protective sheet of clear plastic that is captured within a respective one of the plurality of display frames.

* * * * *